(12) United States Patent
Yang et al.

(10) Patent No.: US 11,886,667 B2
(45) Date of Patent: Jan. 30, 2024

(54) ALWAYS-AVAILABLE INPUT THROUGH FINGER INSTRUMENTATION

(71) Applicant: AUTODESK, INC., San Francisco, CA (US)

(72) Inventors: Xing-Dong Yang, Edmonton (CA); Tovi Grossman, Toronto (CA); Daniel Wigdor, Toronto (CA); George Fitzmaurice, Toronto (CA)

(73) Assignee: AUTODESK, INC., San Francisco, CA (US)

( * ) Notice: Subject to any disclaimer, the term of this patent is extended or adjusted under 35 U.S.C. 154(b) by 0 days.

(21) Appl. No.: 15/926,570

(22) Filed: Mar. 20, 2018

(65) Prior Publication Data

US 2018/0284945 A1    Oct. 4, 2018

Related U.S. Application Data

(62) Division of application No. 14/044,678, filed on Oct. 2, 2013, now Pat. No. 9,921,687.

(Continued)

(51) Int. Cl.
*G06F 3/042*    (2006.01)
*G06F 3/01*    (2006.01)
(Continued)

(52) U.S. Cl.
CPC ............ *G06F 3/0425* (2013.01); *G06F 3/017* (2013.01); *G06F 3/038* (2013.01); *G06F 3/0317* (2013.01);
(Continued)

(58) Field of Classification Search
CPC ............ G06F 2203/0331; G06F 3/014; G06F 3/04847; G06F 3/04883; G06F 2203/0335; G06F 1/163; G06F 2203/0338; G06F 3/033; G06F 3/0425; G06F 3/0421; G06F 2203/04101; G06F 3/0426; G06F 3/03545; G06F 3/017; G06F 3/03542; G06F 2203/04106; G06F 2203/04808;
(Continued)

(56) References Cited

U.S. PATENT DOCUMENTS

| 7,817,816 B2 | 10/2010 | Wang et al. |
| 7,878,408 B2 * | 2/2011 | Lapstun ................. G06F 3/014 235/462.45 |

(Continued)

FOREIGN PATENT DOCUMENTS

CN           102033630 A  *  4/2011  ............ G06F 3/014

*Primary Examiner* — Benjamin X Casarez
(74) *Attorney, Agent, or Firm* — Artegis Law Group, LLP (57) ABSTRACT

A finger device initiates actions on a computer system when placed in contact with a surface. The finger device includes instrumentation that captures images and gestures. When in contact with a surface, the finger device captures images of the surface and gestures made on the surface. The finger device also transmits the images and gesture data to the computer system. An application on the computer system matches the images received from the finger device to a representation of the surface, identifies an action associated with the surface representation and gesture, and executes the action. Instrumenting the finger instead of the surface, allows a user to configure virtually any surface to accept touch input.

19 Claims, 7 Drawing Sheets

Related U.S. Application Data (60) Provisional application No. 61/708,790, filed on Oct. 2, 2012.

(51) Int. Cl.
  *G06F 3/03* (2006.01)
  *G06F 3/038* (2013.01)

(52) U.S. Cl.
  CPC .... *G06F 3/0321* (2013.01); *G06F 2203/0331* (2013.01)

(58) Field of Classification Search
  CPC ............ G06F 3/0488; G06F 3/04186; G06F 3/04886; G06F 21/83; G06F 3/0317; G06F 3/032; G06F 3/0321; G06F 3/038; H04N 2101/00; H04N 2201/0084; H04N 5/23293; H04N 9/3179; H04N 9/3194; H04N 1/2112; H04N 1/32128; H04N 5/2251; H04N 5/23219; H04N 5/351; H04N 13/0203; H04N 13/026; H04N 17/002; H04N 1/00307; H04N 1/00827; H04N 1/10; H04N 1/215; H04N 1/3873; H04N 1/3878; H04N 1/40093; H04N 1/4406; H04N 1/442; H04N 1/444; G02B 26/10; G08B 13/2428; G08B 15/004; G08B 21/0453; G08B 25/001; G08B 25/006; G08B 25/009; G08B 25/016; G08B 25/10; G08B 29/12; G09G 2370/16; G09G 5/006
  USPC .......................................... 345/156, 173–175
  See application file for complete search history.

(56) References Cited

U.S. PATENT DOCUMENTS

| | | | |
|---|---|---|---|
| 8,248,364 B1* | 8/2012 | Chi | G06F 3/0354 345/156 |
| 8,279,039 B2 | 10/2012 | Thorn | |
| 8,611,584 B2* | 12/2013 | Teoh | G06F 3/0317 382/100 |
| 8,787,663 B2* | 7/2014 | Litvak | G06K 9/6289 382/165 |
| 8,997,015 B2 | 3/2015 | Kinoshita | |
| 2005/0190157 A1* | 9/2005 | Oliver | G06F 3/042 345/166 |
| 2008/0199078 A1* | 8/2008 | Lam | G06T 7/337 382/190 |
| 2008/0226134 A1* | 9/2008 | Stetten | G06F 3/0317 340/407.1 |
| 2009/0322673 A1* | 12/2009 | Cherradi El Fadili | G06F 3/017 345/157 |
| 2011/0210931 A1* | 9/2011 | Shai | G06F 3/03547 345/173 |
| 2012/0019562 A1* | 1/2012 | Park | G06F 3/0488 345/657 |
| 2012/0044168 A1* | 2/2012 | Lu | G06F 3/0321 345/173 |
| 2012/0056814 A1* | 3/2012 | Sudo | G06F 3/04883 345/168 |
| 2012/0153020 A1* | 6/2012 | Yoshida | G06F 3/03545 235/375 |
| 2012/0262369 A1* | 10/2012 | Griffin | G06F 3/014 345/157 |
| 2012/0263381 A1* | 10/2012 | Yoshida | G06F 3/038 382/188 |
| 2013/0002611 A1* | 1/2013 | Kim | H04N 5/2254 345/175 |
| 2013/0162864 A1* | 6/2013 | Wang | H04N 5/225 348/231.6 |
| 2013/0257751 A1* | 10/2013 | Stafford | G06F 3/0488 345/173 |
| 2013/0307949 A1* | 11/2013 | Zhang | G06F 3/0426 348/61 |
| 2014/0132512 A1* | 5/2014 | Gomez Sainz-Garcia | G06F 3/014 345/158 |
| 2014/0253512 A1* | 9/2014 | Narikawa | G06F 3/0304 345/175 |
| 2015/0062086 A1* | 3/2015 | Nattukallingal | G06F 3/017 345/175 |
| 2016/0328034 A1* | 11/2016 | Krüger | G06F 3/038 |

* cited by examiner

ALWAYS-AVAILABLE INPUT THROUGH FINGER INSTRUMENTATION

CROSS-REFERENCE TO RELATED APPLICATION

This application is a divisional of the co-pending U.S. patent application titled, "ALWAYS-AVAILABLE INPUT THROUGH FINGER INSTRUMENTATION," filed on Oct. 2, 2013 and having application Ser. No. 14/044,678, which claims priority benefit of the U.S. Provisional Patent Application titled, "MAGIC FINGER ALWAYS AVAILABLE INPUT THROUGH FINGER INSTRUMENTATION," filed on Oct. 2, 2012 and having Application No. 61/708,790. The subject matter of these related applications is hereby incorporated herein by reference.

BACKGROUND OF THE INVENTION

Field of the Invention

Embodiments of the present invention generally relate to computer input devices. More specifically, embodiments presented herein disclose a finger device which allows virtually unlimited interaction with any surface.

Description of the Related Art

Many electronic devices (e.g. smartphones and tablet computers) use touch screens as a mechanism for user input. For instance, tablet computers include touchscreens that accept touch input. Tablet computers perform various tasks in response to different gestures and touches. A tablet computer may interpret a swipe on the touchscreen as a command to scroll though a screen. Likewise, a tablet computer may interpret a tap on the touchscreen as a command to open an application.

Surfaces that accept touch input (e.g. touchscreens) rely on instrumentation to detect touch input. Typically, the surface includes an array of sensors that detect where a finger is contacting the surface. Sensors, such as cameras, may also be placed proximate to a surface to detect how a user touches the surface. Instrumenting a surface to accept touch input can be costly and complex, which limits the number of surfaces that accept touch input.

SUMMARY OF THE INVENTION

One embodiment of the invention includes a method for initiating an action in response to a user touching a surface. This method may generally include receiving an image from a device instrumenting a finger of the user. The finger is in contact with a surface. This method may also include identifying, from the image, the surface contacted by the finger of the user and matching the identified surface to an action executed by a computing device. This method may also include executing the action.

Another embodiment of the invention includes a device worn on a finger. The device itself may comprise a camera configured to capture images of a surface and a microcontroller configured to detect when the finger of a user wearing the device touches a surface. In response to the figure touching a surface, the device may (i) capture an image of the surface and (ii) transmit the image to a computing system.

Other embodiments include, without limitation, a computer-readable medium that includes instructions that enable a processing unit to implement one or more aspects of the disclosed methods as well as a system having a processor, memory, and application programs configured to implement one or more aspects of the disclosed methods. One advantage of the disclosed techniques is that the user is able to interact with a variety of surfaces without having to instrument the surfaces.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments presented herein provide an instrumented device that can sense and discriminate surfaces touched by an individual wearing the device. The instrumented finger device can be used to initiate actions in response to a user touching a surface. In one embodiment, a user may initiate an action by performing a gesture (e.g. tapping, swiping, or pressing) with a finger on a surface. The user can interact with virtually unlimited types of surfaces. That is, rather than instrumenting an object to receive user input via a touch-sensitive display (or other instrumented surface), the user instruments their finger. Once instrumented, the device worn by the user senses what is being touched and initiates actions in response. Doing so allows virtually any given surface to be used as a trigger for some action. Accordingly, in one embodiment, a user wears a device on their finger. When the user touches a surface, the device contacts the surface. The device may include sensors that capture images of the surface touched by the user. When the user touches a surface, the device transmits images of the surface to a computer system. An application running on the computer system receives input from the device and executes an action in response. Significantly, the action depends on what surface is touched by the user.

To execute an action, the application matches images received from the device to a library. If a match is found, the application determines what action has been associated with the touched surface and executes that action. Thus, the device inverts the typical relationship between the finger and touch input on a surface, i.e. the device instruments the finger instead of the surface.

To configure a surface to accept touch input, the application maps the surface to an action. The application presents an interface that allows a user to map actions to various combinations of surfaces and gestures.

For example, the user could configure the application to answer a phone call (or mute a ringtone) when the user touches a finger on a specific region on a shirt. When the user touches the shirt, the device captures images of the shirt. The device transmits the images captured when the device is touched against a surface to the application. Continuing with the example above, the application matches the surface of a shirt with an action to answer a call (or mute a ringtone) or to direct a call to voicemail. For example, a user could configure the application to answer a call if they tap their shirt, but send a call to voicemail if they tap their pants.

Further, the device may be able to sense gestures made by a user—based on dynamic changes in the image captured by the device. In such as case, the device transmits data representing a gesture along with images of the surface to the computer system. The application then determines an action associated with the touched surface and the gesture made on the surface.

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
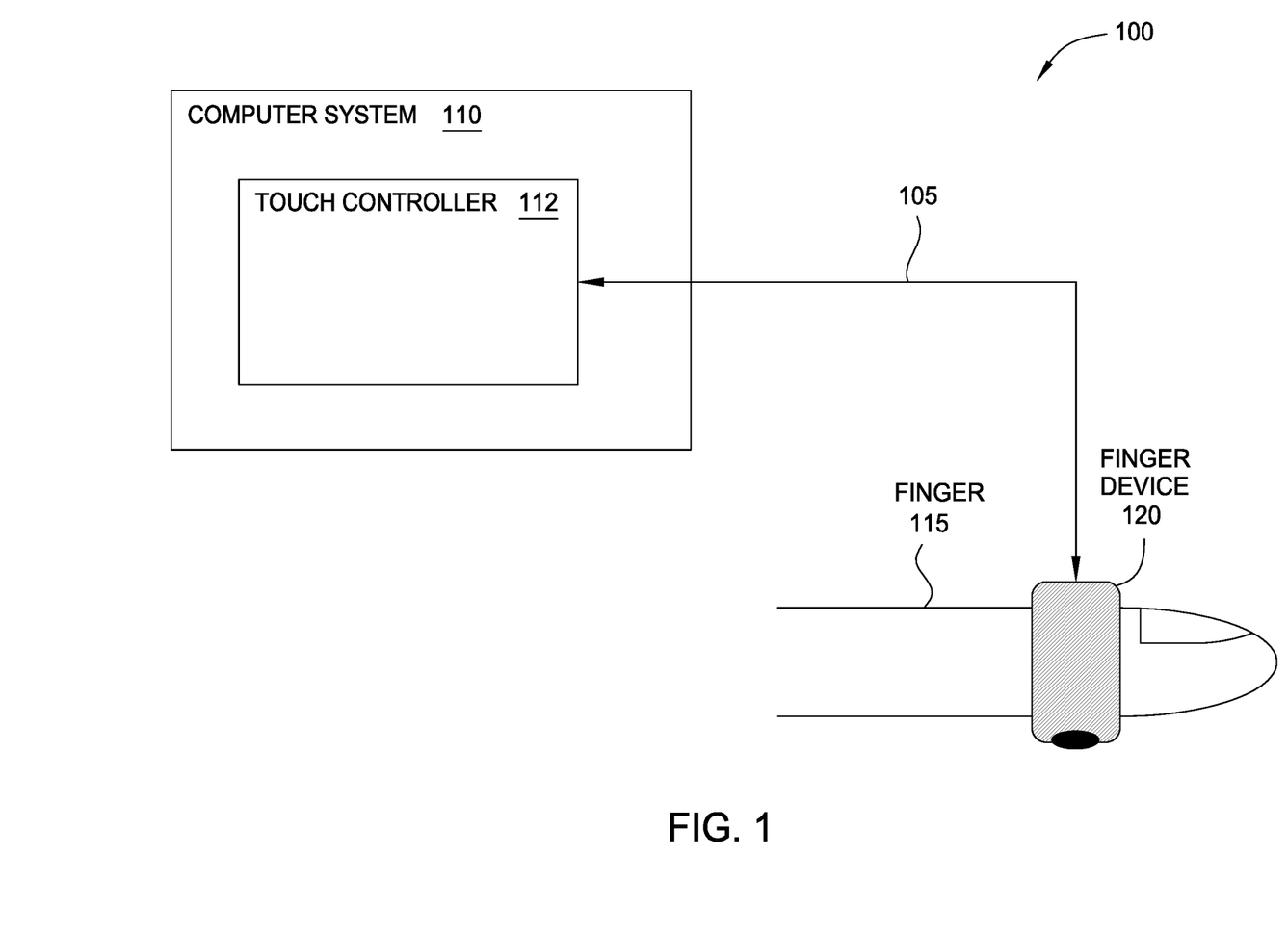
FIG. 1 illustrates a system configured to respond to a user touching a surface with a instrumented finger device, according to one embodiment.

FIG. 1 illustrates a system configured to respond to a user touching a surface with an instrumented finger device, according to one embodiment. As shown, the system 100 includes a device 120 worn on finger 115 and coupled to a computer system 110. The computer system 110 may be a personal computer, laptop, or a mobile device, e.g. tablet, smart phone, smart watch, or headset. Illustratively, the computer system 110 includes a touch controller 112. The device 120 is coupled to the touch controller 112 via a communications link 105.

To detect the user touching a surface, the device 120 includes a camera that captures images. That is, when the user contacts a surface, the camera captures images of the surface. When the user touches a surface, the device 120 transmits images of the touched surface to the touch controller 112, via communications link 105. Communications link 105 may be a wired connection that transports data and power, such as a USB connection. In other embodiments, the communications link 105 may be a wireless connection that transports data, but not power, such as a Bluetooth connection.

The touch controller 112 is an application configured to execute actions in response to a user touching a surface. That is, the touch controller 112 executes an action associated with a touched surface. The user maps actions to surfaces using the touch controller 112. Actions may include commands to launch applications or send notifications, or a variety of other programmatic responses to a user touching a given surface.

In one embodiment, the computer system 110 includes a library that stores representations of surfaces. A surface may be the natural surface of a particular object or a surface created by a user. For example, a user might print a series of text characters with a small font size while varying the color or darkness of the characters to create patterns or icons. Other markers could be miniature bar codes, dot codes, fiducial markers, etc. For instance, the user could create an icon to represent desktop applications, such as a word processor, browser, spreadsheet, email client, etc. In such a case, the user could affix the printed markers to a surface at their desk. When the user then touches one of the printed markers with the instrumented finger, the touch controller 112 could determine which printed marker the user touched and launch the corresponding application. Similarly, functions of an application could be associated with printed markers or with different surfaces available for a user to touch.

The stored representations of each surface may include a label, a sample image, features of the surface, and mappings to various actions. Persons skilled in the art will recognize that a variety of techniques may be used to extract features of a surface shown in an image. For example, in one embodiment, surfaces may be represented using a local binary patterns (LBP) algorithm. Using the LBP algorithm, the touch controller 112 detects 10 microstructures inside the texture of the surface shown in an image. The 10 microstructures are features that can be used to distinguish one surface from another. In other embodiments, the touch controller 112 may extract features from the colors in an image of a surface.

To better identify surfaces, the touch controller 112 may include a classifier. Persons skilled in the art will recognize that a variety of techniques may be used to implement a classifier. For example, in one embodiment, the classifier may be implemented as the library for support vector machine (LIBSVM). The touch controller 112 trains the classifier with the library. The library includes images and features of particular types of surfaces, e.g. the surface of a desk. The touch controller 112 may present an interface through which the user can add new surface representations and associated images or update the library with additional images for an existing surface. Once trained, the touch controller 112 may use the classifier to identify a surface, based upon the features in an image.

As noted, the touch controller 112 is also configured to recognize fiducial markers (e.g. data matrix codes) within an image. To distinguish fiducial markers, the touch controller 112 may include a decoder. For example, in one embodiment, the decoder may be implemented with the data matrix decoding package icEveryCode.™ The decoder determines whether a fiducial marker, such as a barcode, is present. If a fiducial marker is present, then the decoder determines a value associated with the fiducial marker. The touch controller 112 may store various fiducial markers within the library.

The touch controller 112 allows a user to configure a mapping from a touch on a given surface to a specified action. That is, the touch controller 112 allows a user to configure how the computer system 110 should respond to touches made by a user. The touch controller 112 may present an interface that includes a list of surfaces and a list of actions. The list of surfaces may include sample images and user supplied labels for each surface. When the user selects an action for a particular surface, the touch controller 112 maps the selected action to the selected surface.

As discussed, the touch controller 112 may store mappings defined by the user in the library. For example, if the user selects the action of muting the ringtone of a phone when the user touches the surface of a shirt, then the touch controller 112 would store a mapping between the action of muting the ringtone and the representation of the shirt in the library. Likewise, the user could map a surface, such as an icon made of the text characters, to the action of launching an application. Then the user can place the icon in a convenient location and launch the application by tapping the device 120 on the icon.

Once actions are mapped to surfaces, the touch controller 112 can execute an action when the user touches a surface. The touch controller 112 executes an action, in response to receiving images of a touched surface from the device 120. To determine what action to invoke, the touch controller 112 identifies the touched surface based on an image received from the device 120. The touch controller 112 identifies the touched surface by matching an image of the touched surface from the device 120 to the library. As discussed, the touch controller 112 may use a classifier to match an image to a surface representation in the library. In some cases, the touch controller 112 uses the LBP algorithm to detect texture features in the image. The classifier then matches the texture features of the image to texture features of the representation of a particular type of surface in the library. Once identified, the touch controller 112 executes the action associated with the surface representation. That is, the touch controller 112 executes an action in response to the user touching the finger 115 on a surface.

While described as including the library of surface representations, in other embodiments, the computer system 110 may access, via network 120, surface representations stored on a physical computing system (e.g., a system in a data center) or a virtual computing instance executing within a computing cloud.

In addition, the touch controller 112 may execute an action based on a gesture made on a given surface. In one embodiment, the device 120 may include an optical flow sensor. The optical flow sensor evaluates images of the surface to determine a direction and a speed of movement, and therefore the direction and speed of movement of a user performing a gesture.

To recognize gestures, the touch controller 112 receives data describing the direction and speed of movement of the device 120, the touch controller 112 compares the data against patterns of movement to identify the gesture made by the user. The user maps actions to gestures made on surfaces using the touch controller 112. That is, a surface representation may be associated with mappings, distinguished by gesture, such that the touch controller 112 may select an action based on (1) a surface and (2) a gesture performed on that surface.

While described as executing commands, in other embodiments, the actions may provide continuous control of various parameters. For example, touch controller 112 could turn down the volume of an audio speaker when the user swipes the device 120 down a side of the audio speaker. The touch controller 112 could also control a pointer on a screen displayed by computer system 110 when the user gestures on the back of a tablet computer. Controlling the pointer with gestures on the back of a tablet computer allows the user to interact with the tablet computer without occluding the screen.

In still other embodiments, the actions may change between different operating modes. For example, when in a normal mode the touch controller 112 could launch a word processing application if the user taps on a table. However, if the user taps on a print-out of a presentation, the touch controller 112 could enter a presentation mode. If the user taps on a table while the touch controller 112 is in this presentation mode, then the touch controller 112 could couple the display of the computing device 110 to a projector. If the user then pinches the device 120 against their thumb while the touch controller 112 remains in presentation mode, then the touch controller 112 could advance the presentation. That is, the current operating context of an application may be used to take different actions for the same touched surface (or surface and gesture).

While described as mapping single surfaces and gestures to actions, in other embodiments, the touch controller 112 may map combinations of multiple gestures and surfaces to actions. For example, the touch controller 112 could display a presentation via a projector, if the user swipes from a print-out of the presentation to a table.

In addition, in another embodiment, the touch controller 112 may allow the user to define custom gestures, e.g. swiping vertically and then swiping horizontally to form a cross or dragging the device 120 in a circle. The user maps actions to these custom gestures made on surfaces using the touch controller 112.

Figure 2:
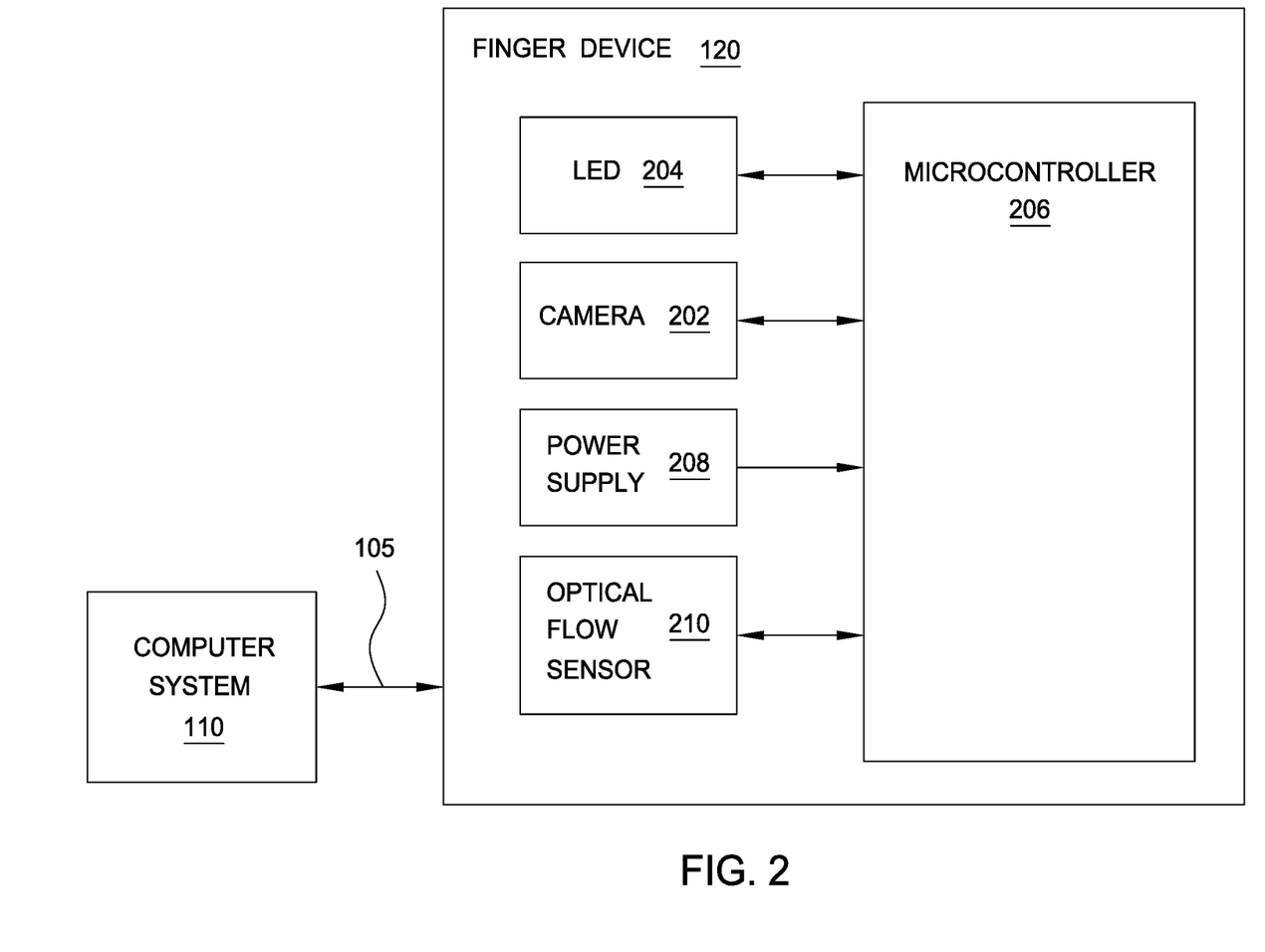
FIG. 2 illustrates an example of a device used to instrument a finger, according to one embodiment.

FIG. 2 illustrates an example of a device 120 used to instrument a finger, according to one embodiment. The device 120 captures images of a surface and the motion of a finger proximate to the surface. Once captured, the device 120 transmits the images to a computing system that invokes an action based on the surface touched by a user. The device 120 can be provided in a variety of form factors that can fit on a finger. For instance, the device 120 could be embedded on a ring or thimble like structure worn on the tip of the finger. Doing so allows the device 120 to be available, but unobtrusive to the user. This fitting also allows a user to remove the device 120 when desired, or twist the device 120 to deactivate sensing of touched surfaces. Alternatively, the device 120 may be embedded under a user's fingernail, on the surface of the fingertip, or partially implanted under the skin of the finger with exposed components for sensing.

As shown, the device 120 includes a microcontroller 206 coupled to a power supply 208, a camera 202, an optical flow sensor 210, and a light-emitting diode (LED) 204. A communications link 105 couples the device 120 to the computer system 110. As discussed, communications link 105 may include a wired connection that transports data and power, such as a USB connection.

The power supply 208 is configured to distribute power to the various components of the device 120. The power supply 208 may receive power from the computer system 110 via communications link 105. For instance, the communications link 105 may include a USB connection that carries power. In other embodiments, the power supply 208 may produce or store power. For instance, the power supply 208 may include a rechargeable battery. The power supply 208 may also include circuitry to harvest ambient power from the surrounding environment, e.g. the body or motion of the user.

In one embodiment, the device 120 captures images of a surface with camera 202. In one embodiment, the camera 202 may be a micro red green blue (RGB) camera, e.g. the AWAIBA NanEye micro RGB camera. The small form factor of camera 202 allows it to fit in the device 120. The camera 202 captures an image in response to receiving a signal from the microcontroller 206. The camera 202 can provide an image to the microcontroller 206 as collections of pixels, e.g., a 248×248 pixel image. Depending on the position of the camera 202 relative to other components of the device 120, the borders of the captured images may include artifacts, e.g., shadows. As discussed below, the touch controller 112 may crop images captured by the camera 202 to remove such artifacts.

In one embodiment, the device 120 captures gestures with the optical flow sensor 210. As discussed, the optical flow sensor 210 is configured to detect motion across a surface. The optical flow sensor 210 may include a high-speed but low-resolution camera. In one embodiment, the optical flow sensor 210 may be an ADNS 2620 optical flow sensor, commonly used in optical mice. When proximate to a surface, the optical flow sensor 210 detects motion by rapidly capturing images of the surface, identifying differences between the images, and calculating a direction and speed of movement based upon the differences. The optical flow sensor 210 may transmit the direction and speed of movement as a series of coordinates, using an initial point of contact with the device. After the initial point of contact, coordinates are provided that indicate changes in position relative to the initial point of contact.

In other embodiments, a mechanical device (e.g. a trackball) or an accelerometer may be used in place of the optical flow sensor 210. Although described as distinct components, in still other embodiments, the camera 202 and optical flow sensor 210 may be combined into a single component with a camera capable of capturing high-resolution images at high-speeds.

When the finger is pressed against a surface, the ambient lighting may be insufficient for the camera 202 and optical flow sensor 210 to capture images. Accordingly, the LED 204 provides light for the camera 202 and optical flow sensor 210. The camera 202, optical flow sensor 210, and LED 204 are positioned proximate to one another in the device 120.

The microcontroller 206 is configured to control the operation of the camera 202, optical flow sensor 210, and LED 204. The microcontroller 206 also retrieves data from the camera 202 and optical flow sensor 210. The microcontroller 206 may process the data retrieved from the camera 202 and optical flow sensor 210.

For instance, the microcontroller 206 may process images from the camera 202 to determine when the device 120 is contacting a surface. To do so, the microcontroller 206 continually retrieves images from the camera 202. The microcontroller 206 determines whether the device 120 is contacting a surface by identifying changes in contrast between subsequent images. The microcontroller 206 may determine the contrast within a region of the image by averaging a square difference between each pixel and a neighboring pixel in the region. When the contrast of an image is more than twice the contrast of the previous image, the microcontroller 206 determines that the device 120 initially contacts a surface. When the device 120 contacts a surface, the microcontroller 206 continues to analyze the contrast. The microcontroller 206 determines that the device 120 is no longer contacting a surface when the contrast of the current image is less than a threshold value. Alternatively, the device 120 may include a switch that activates when the device 120 touches a surface.

While the device 120 contacts a surface, the microcontroller 206 transmits images (and gesture data) to the computer system 110. As discussed, the computer system 110 analyzes this information to determine which action (if any) to execute. Thus, the device 120 initiates actions by detecting contact with a surface and transmitting images to the computer system 110.

Although discussed as transmitting data to the computer system 110, in other embodiments, the device 120 may also receive instructions or data from the computer system 110. The computer system 110 may instruct the microcontroller 206 to continually retrieve and transmit image data, whether the device 120 is contacting a surface or not. For instance, the device 120 could enable a user to look under an object by continually retrieving and transmitting image data while the user holds their finger under the object. In such a case, the computer system 110 would display the image data to the user.

In other embodiments, the device 120 may communicate with other devices. For instance, the device 120 may send data encoded in Morse code by blinking the LED 204. The device 120 may also receive data by identifying a pattern of blinking light in the images that the camera 202 captures.

Figure 3:
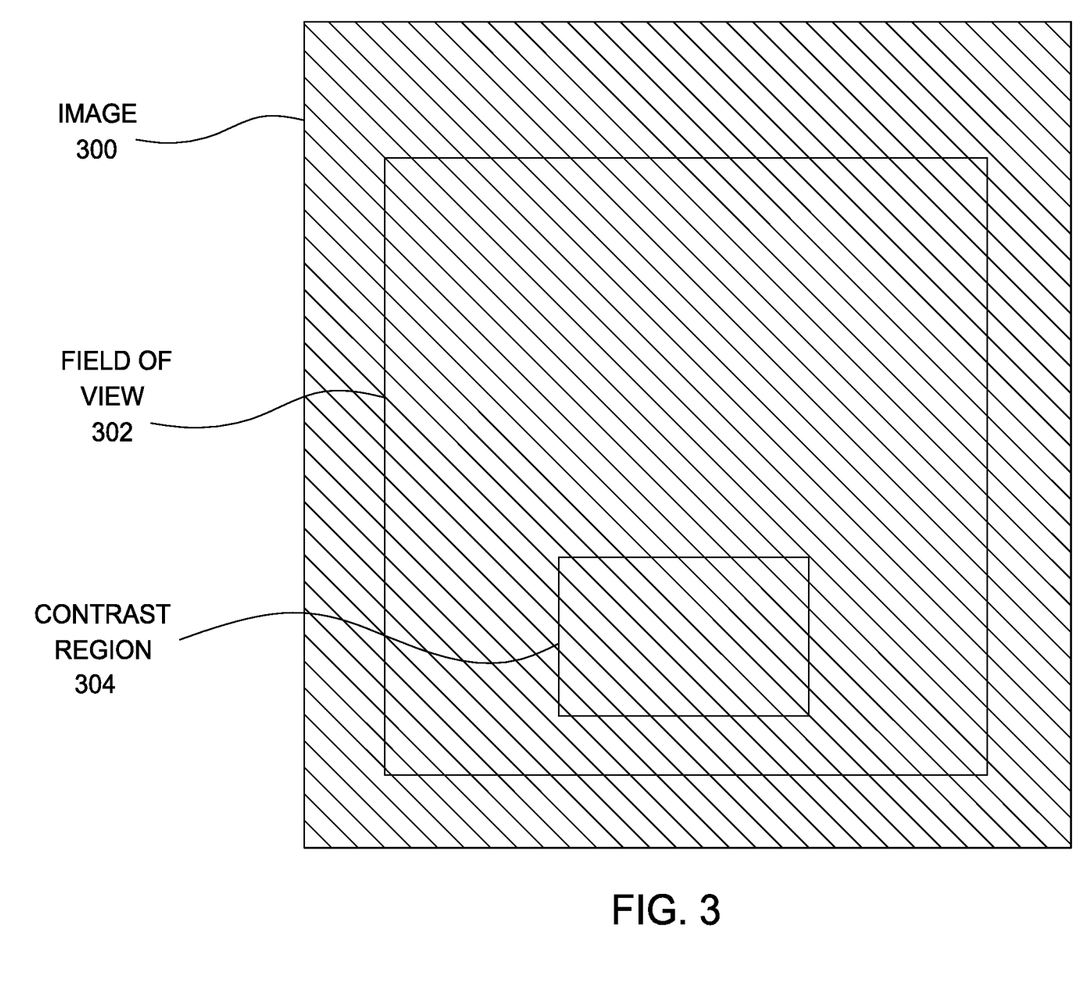
FIG. 3 illustrates regions of an image of a surface, according to one embodiment.

FIG. 3 illustrates regions of an image 300 of a surface, according to one embodiment. The camera 202 captures the image 300, which the microcontroller 206 and touch controller 112 analyze. Instead of analyzing the entire image, the microcontroller 206 and touch controller 112 may more efficiently analyze regions within the image. As shown, the image 300 includes two such regions, illustrated as a field of view 302 and a contrast region 304.

As discussed, the microcontroller 206 analyzes images captured by the camera 202 to determine whether the device 120 has contacted a surface. The microcontroller 206 may optimize this determination by analyzing the contrast region 304 of each image, instead of the entire image. If the image is 248×248 pixels, then the contrast region 304 may be 60×60 pixels. Since the contrast region 304 includes fewer pixels, the microcontroller 206 can perform an analysis more efficiently.

In other embodiments, the microcontroller 206 may further optimize the determination of whether the device 120 is contacting a surface, by converting color images from the camera 202 to grayscale images. The microcontroller 206 may perform this conversion because grayscale images are typically faster to analyze than color images. The microcontroller 206 may also transmit the smaller grayscale images to the touch controller 112 instead of the color images.

The touch controller 112 selects an action to execute when the user touches a surface, by identifying the touched surface. The touch controller 112 identifies the touched surface by matching images of the touched surface from the device 120 to a library. As discussed, the touch controller 112 matches an image to the library according to the features in the image. However, depending on the position of the camera 202 and other components within the device 120, the edges of the image 300 may include various artifacts (e.g. shadows or wires). These artifacts may prevent the touch controller 112 from accurately identifying the surface shown in an image. Therefore, the touch controller 112 may analyze the features shown within the field of view 302 instead of the entire image 300.

Figure 4:
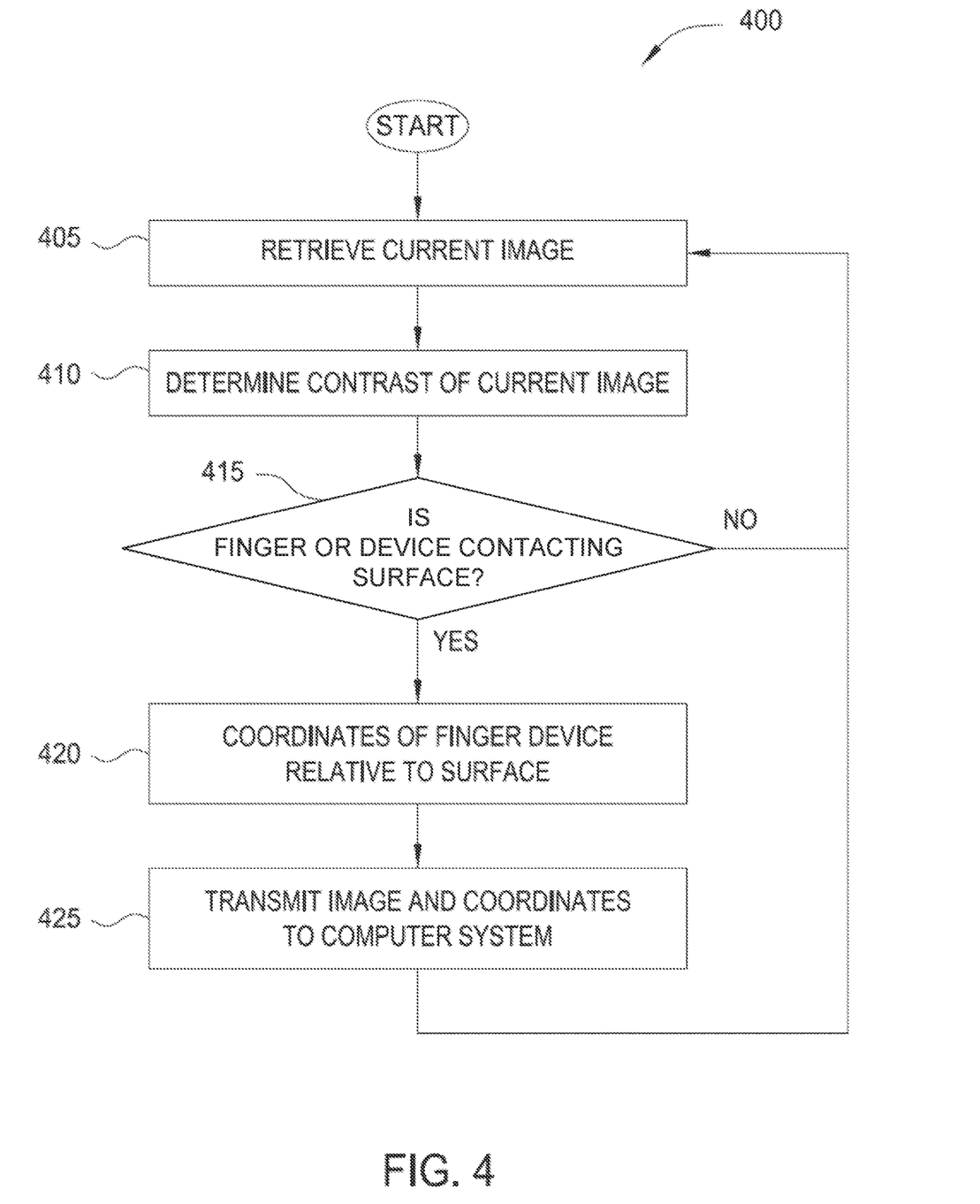
FIG. 4 illustrates a method for determining when a finger device is contacting a surface, according to one embodiment.

FIG. 4 illustrates a method for determining when a finger device is contacting a surface, according to one embodiment. Although the method steps are described in conjunction with the system of FIG. 1 and FIG. 2, persons skilled in the art will understand that any system configured to perform the method steps, in any order, is within the scope of the present invention.

As shown, method 400 begins at step 405, where the microcontroller 206 retrieves a current image from the camera 202. As noted, the image itself may comprise an array of pixel values.

At step 410, the microcontroller 206 determines a contrast of the current image. As discussed, the microcontroller 206 may determine the contrast by averaging the squared difference between each pixel and a neighboring pixel within a region of the current image. The microcontroller 206 may determine the contrast within the contrast region 304.

At step 415, the microcontroller 206 determines if the device 120 is contacting a surface. To determine when the device 120 initially contacts a surface, the microcontroller 206 compares the contrast of the current image to the contrast of the previous image. The microcontroller 206 continually retrieves images and calculates the contrast for the images. The microcontroller 206 also stores the contrast of the previous image for comparison. If the microcontroller 206 does not yet have the contrast of the previous image stored, then the microcontroller 206 determines that the device 120 is not contacting a surface. If the contrast of the current image is less than or equal to twice the contrast of the previous image, then the device 120 is not contacting a surface. However, if the contrast of the current image is more than twice the contrast of the previous image, then the device 120 is contacting a surface.

While the device 120 remains in contact with a surface, the microcontroller 206 compares the contrast of the current image to a threshold value. If the device 120 has been contacting a surface and the contrast is less than the threshold value, then the device 120 is no longer contacting the surface. If the device 120 has been contacting a surface and the contrast is greater than or equal to the threshold value, then the device 120 is still contacting the surface. If the microcontroller 206 determines that the device 120 is not in contact with a surface, then the method 400 returns to step 405. Otherwise, the microcontroller 206 determines that the device 120 is in contact a surface and the method 400 proceeds to step 420.

At step 420, the microcontroller 206 determines movement of the device 120 relative to the surface. As noted, an optical flow sensor 210 may be used to track the movement of the device 120 across a surface. In this case, the microcontroller 206 retrieves coordinates representing the movement of the device 120 from the optical flow sensor 210.

At step 425, the microcontroller 206 transmits image and coordinates to the computer system 110. While the device 120 is contacting a surface, the microcontroller 206 continues to retrieve and transmit images to the computer system 110. The series of coordinates transmitted by the microcontroller represents the gesture of the finger on a surface.

Figure 5:
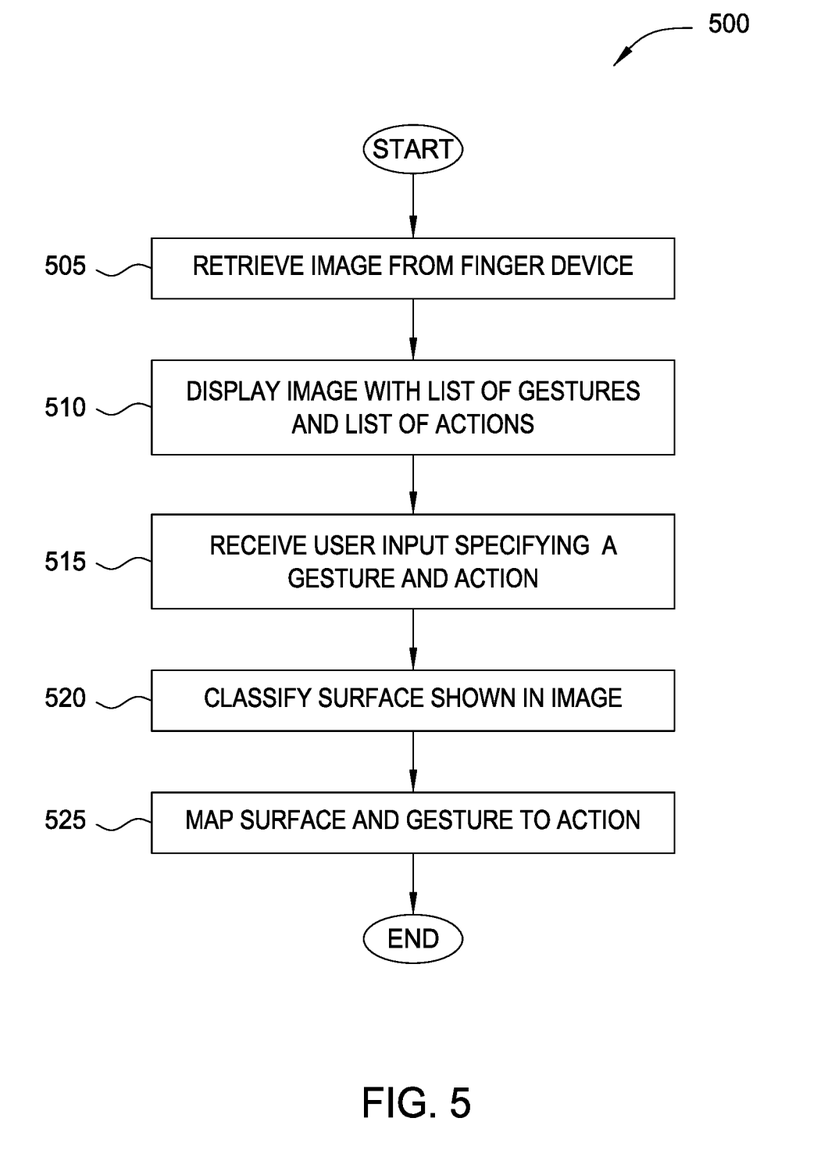
FIG. 5 illustrates a method for associating an action to surface touches made by a user wearing an instrumented figure device, according to one embodiment of the present invention.

FIG. 5 illustrates a method for associating an action to surface touches made by a user wearing an instrumented figure device, according to one embodiment of the present invention. Although the method steps are described in conjunction with the system of FIG. 1 and FIG. 2, persons skilled in the art will understand that any system configured to perform the method steps, in any order, is within the scope of the present invention.

As shown, method 500 begins at step 505, where the touch controller 112 receives a training or reference image of a surface from the device 120. For example, a user may touch the surface of their desk with the device 120. The device 120 would then capture an image of the desk and transmit that image to the touch controller 112 as a training image.

At step 510, the touch controller 112 displays the training image and a list of actions. At step 515, the touch controller 112 receives input specifying an action to associate with the surface shown in the training image. In addition, the user may also specify a gesture required for the action. For instance, if the user would like a word processor to launch each time the device 120 swipes the displayed surface, then the user would select the swipe gesture and the action of launching the word processor.

At step 525, the touch controller 112 maps a surface representation to the specified action. The touch controller 112 determines features of the surface shown in the training image. The touch controller 112 may determine features from the texture of the surface shown in the training image. The touch controller 112 then adds the texture features, training image, and specified action to a library. As discussed, the touch controller 112 may include a classifier. At step 520 the touch controller 112 may train the classifier on the texture features extracted from the training image. Doing so trains the classifier to identify a surface representation (and associated action) when the touch controller 112 receives subsequent images of the surface from the device 120.

In addition, the touch controller 112 may associate various actions to gestures on a surface. The touch controller 112 may add the gesture to the library. As such, when the touch controller 112 identifies a surface representation, the touch controller 112 may further distinguish an action to execute based upon a gesture received from the device 120. For example, tapping on the surface of a desk could be mapped to the action of opening a word processor, but the swiping across the desk could be mapped to saving a document that is open in the work processor.

Figure 6:
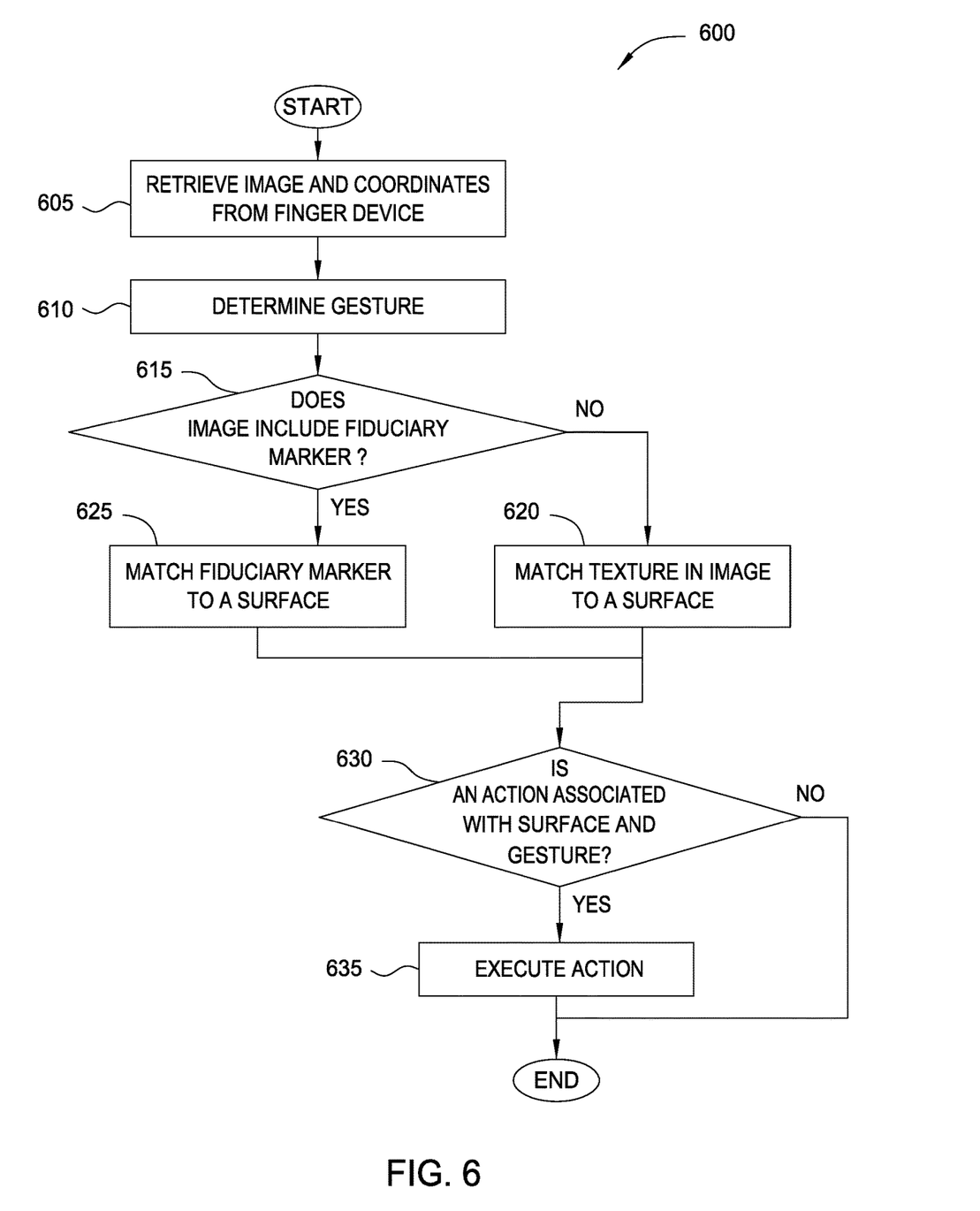
FIG. 6 illustrates a method for initiating an action based on a user touching a surface with an instrumented finger device, according to one embodiment.

FIG. 6 illustrates a method for initiating an action based on a user touching a surface with an instrumented finger device, according to one embodiment. Although described in conjunction with the system of FIG. 1 and FIG. 2, persons skilled in the art will understand that any system configured to perform the method steps, in any order, is within the scope of the present invention.

As shown, method 600 begins at step 605, where the touch controller 112 receives an image when the device 120 contacts a surface. The image includes sufficient detail for the touch controller 112 to determine features of the texture of the surface. As discussed, the touch controller 112 may also receive coordinates representing the motion of the device 120 on the surface.

At step 620, the touch controller 112 matches the image to a surface representation in a library. As discussed, the touch controller 112 may extract texture features from the image. The touch controller 112 may then use a classifier to identify a surface representation in the library, based on the extracted texture features. As noted, the image may include fiducial markers. Accordingly, the touch controller 112 may includes a decoder capable of recognizing a fiducial marker at step 615. Once recognized, at step 625 the touch controller 112 identifies a surface representation based on the fiducial marker.

At step 630, the touch controller 112 determines if an action is associated with the surface representation. If there is not an action associated with the surface representation, then the method 600 ends. Otherwise, if the is an action associated with the surface representation, then at step 635, the touch controller 112 executes the associated action. The associated action may include a command (e.g. launching an application or sending a notification), or a variety of other programmatic responses to a user touching the surface.

As noted above, the surface may be associated with actions, distinguished by gestures. At step 610 the touch controller 112 may therefore determine a gesture from coordinates received in step 605. After determining the gesture, the touch controller determines if an action is associated with the gesture on the surface at step 630.

Figure 7:
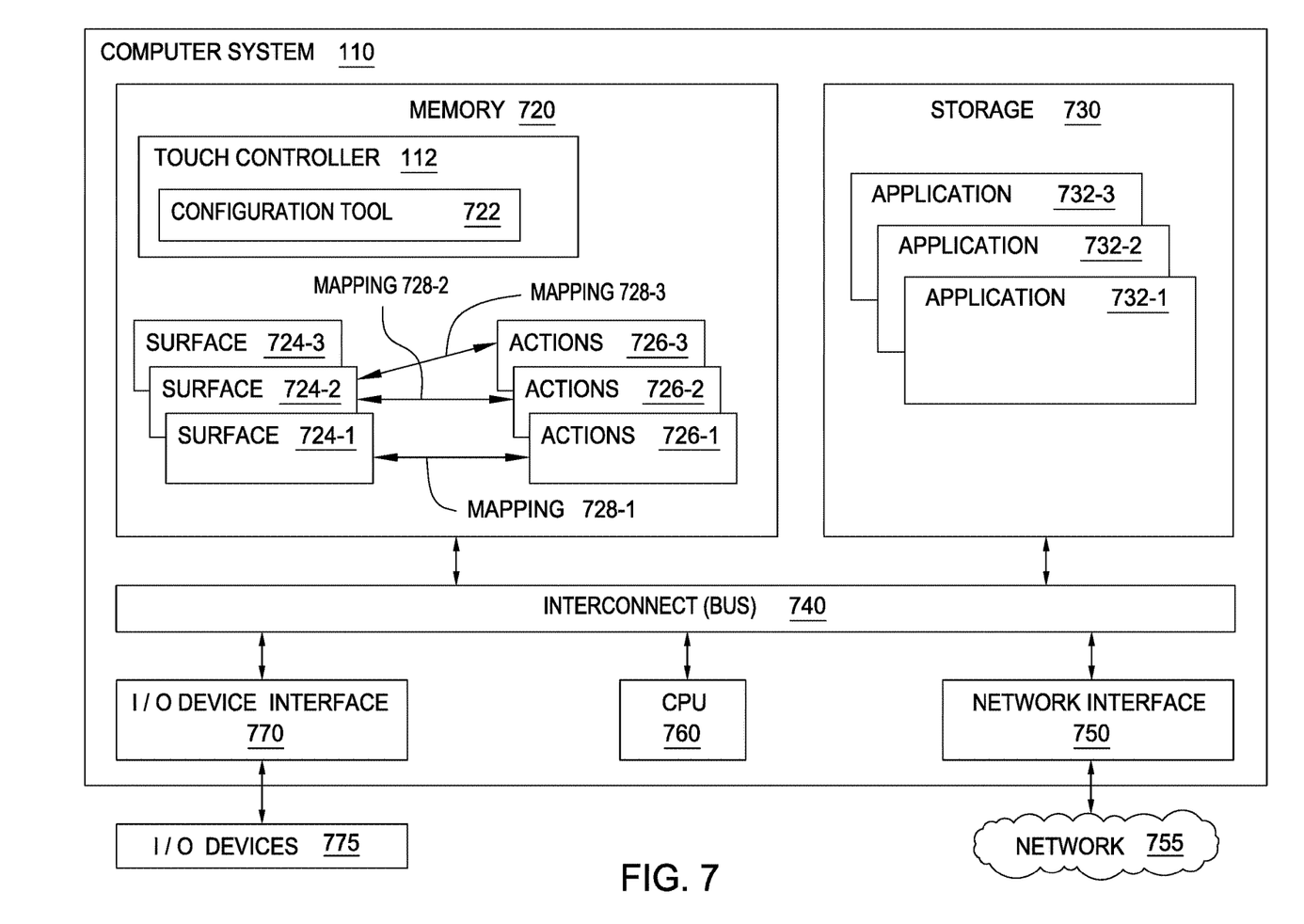
FIG. 7 illustrates a computing system configured to implement one or more aspects of the present invention.

FIG. 7 illustrates a computing system configured to implement one or more aspects of the present invention. As shown, the computing system 110 includes, without limitation, a central processing unit (CPU) 760, a network interface 750 coupled to a network 755, a memory 720, and storage 730, each connected to an interconnect (bus) 740. The computing system 110 may also include an I/O device interface 770 connecting I/O devices 775 (e.g., keyboard, display, mouse, three-dimensional (3D) scanner, and/or touchscreen) to the computing system 110. Further, in context of this disclosure, the computing elements shown in computing system 110 may correspond to a physical computing system (e.g., a system in a data center) or may be a virtual computing instance executing within a computing cloud.

The CPU 760 retrieves and executes programming instructions stored in the memory 720 as well as stores and retrieves application data residing in the storage 730. The interconnect 740 is used to transmit programming instructions and application data between the CPU 760, I/O devices interface 770, storage 730, network interface 750, and memory 720. Note, CPU 760 is included to be representative of a single CPU, multiple CPUs, a single CPU having multiple processing cores, and the like. And the memory 720 is generally included to be representative of a random access memory. The storage 730 may be a disk drive storage device. Although shown as a single unit, the storage 730 may be a combination of fixed and/or removable storage devices, such as fixed disc drives, removable memory cards, or optical storage, network attached storage (NAS), or a storage area-network (SAN).

Illustratively, the memory 720 includes the touch controller 112, various surface representations 724, actions 726, and mappings 728. The various surface representations 724 may be included within a library, not shown. The touch controller 112 includes a configuration tool 722 that creates the mappings 728 between the surface representations 724 and actions 726. The configuration tool 722 may create the mappings based upon user input. As discussed, the configuration tool 722 may map multiple actions, such as action 726-2 and 726-3 to a single surface representation 724-2. The various mappings may be associated with gestures or modes of the touch controller 112. Thus, the touch controller 112 identifies an action to execute based upon the surface that the user contacts, the gesture made on the surface, and the mode of the touch controller 112.

The storage 730 includes various applications 732. An action may include commands to launch an application. For instance, the action 726-1 may include commands to launch application 732-2. The touch controller 112, thereby, launches the application 732-2 in response to the user interacting with surface 724-1, which is mapped to action 726-1.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

We claim:

1. A device worn on a finger, the device comprising:
    a camera configured to capture images of a surface; and
    a microcontroller that:
        detects, based on a tlea st an analysis of a first image of the surface retrieved from the camera by the microcontroller, that the finger of a user wearing the device touches the surface, wherein the analysis of the first image comprises an analysis of only a first sub-region of the first image, and
        in response to detecting that the finger of the user touches the surface, transmits the first image to a computing system to determine an executable action based ononly a second sub-region of the first image, wherein the second sub-region of the first image is different from the first sub-region of the first image.

2. The device of claim 1, wherein the microcontroller further measures a relative movement of the finger while in contact with the surface.

3. The device of claim 1, wherein detecting that the finger of the user wearing the device touches the surface comprises:
    calculating a first contrast associated with the first image retrieved by the microcontroller;
    calculating a second contrast associated with a second image retrieved by the microcontroller; and
    determining that a difference value associated with the first contrast and the second contrast exceeds a threshold value.

4. The device of claim 1, wherein the microcontroller further detects that the finger of the user wearing the device ceases touching the surface.

5. The device of claim 4, wherein detecting that the finger of the user wearing the device ceases touching the surface comprises:
    calculating a first contrast associated with a second image retrieved by the microcontroller; and
    determining that the first contrast is less than a threshold value.

6. The device of claim 1, wherein the analysis of the first image comprises converting the first sub-region of the first image from color to grayscale before performing the analysis of the first sub-region of the first image.

7. The device of claim 1, wherein the second sub-region of the first image is larger than the first sub-region of the first image.

8. The device of claim 1, wherein the second sub-region has a predetermined size and predetermined location within the first image.

9. The device of claim 1, wherein the microcontroller further coverts the first image from color to gray scale prior to transmitting the first image to the computing system.

10. A method for detecting when a finger is touching a surface, comprising:
    capturing images of the surface via a device worn on the finger;
    detecting, based on at least an analysis of a first image of the surface captured via the device, that the finger of a user wearing the device touches the surface, wherein the analysis of the first image comprises an analysis of only a first sub-region of the first image; and
    in response to detecting that the finger of the user touches the surface:

transmitting the first image to a computing system to determine an executable action based on only a second sub-region of the first image, wherein the second sub-region of the first image is different from the first sub-region of the first image.

11. The method of claim 10, further comprising measuring a relative movement of the finger while in contact with the surface.

12. The method of claim 10, wherein detecting that the finger of the user wearing the device touches the surface comprises:
   calculating a first contrast associated with the first image captured via the device;
   calculating a second contrast associated with a second image captured via the device; and
   determining that a difference value associated with the first contrast and the second contrast exceeds a threshold value.

13. The method of claim 10, further comprising detecting that the finger of the user wearing the device ceases touching the surface.

14. The method of claim 13, wherein detecting that the finger of the user wearing the device ceases touching the surface comprises:
   calculating a first contrast associated with a second image captured via the device; and
   determining that the first contrast is less than a threshold value.

15. A non-transitory computer-readable storage medium storing instructions that, when executed by a processor, cause the processor to performing operations comprising:
   capturing images of a surface via a device worn on a finger;
   detecting, based on at least an analysis of a first image of the surface captured via the device, that the finger of a user wearing the device touches the surface, wherein the analysis of the first image comprises an analysis of only a first sub-region of the first image; and
   in response to detecting that the finger of the user touches the surface:
      transmitting the first image to a computing system to determine an executable action based on only a second sub-region of the first image, wherein the second sub-region of the first image is different from the first sub-region of the first image.

16. The computer-readable storage medium of claim 15, wherein the instructions, when executed by the processor, further cause the processor to perform operations comprising measuring a relative movement of the finger while in contact with the surface.

17. The computer-readable storage medium of claim 15, wherein detecting that the finger of the user wearing the device touches the surface comprises:
   calculating a first contrast associated with the first image captured via the device;
   calculating a second contrast associated with a second image captured via the device; and
   determining that a difference value associated with the first contrast and the second contrast exceeds a threshold value.

18. The computer-readable storage medium of claim 15, wherein the instructions, when executed by the processor, further cause the processor to perform operations comprising detecting that the finger of the user wearing the device ceases touching the surface.

19. The computer-readable storage medium of claim 18, wherein detecting that the finger of the user wearing the device ceases touching the surface comprises:
   calculating a first contrast associated with a second image captured via the device; and
   determining that the first contrast is less than a threshold value.

* * * * *

UNITED STATES PATENT AND TRADEMARK OFFICE
CERTIFICATE OF CORRECTION

PATENT NO. : 11,886,667 B2
APPLICATION NO. : 15/926570
DATED : January 30, 2024
INVENTOR(S) : Xing-Dong Yang et al.

It is certified that error appears in the above-identified patent and that said Letters Patent is hereby corrected as shown below:

In the Claims

Column 12, Claim 1, Line 9, please delete "a tlea st" and insert --at least--;

Column 12, Claim 1, Line 18, please delete "ononly" and insert --on only--;

Column 12, Claim 9, Line 55, please delete "gray scale" and insert --grayscale--;

Column 13, Claim 15, Line 29, please delete "Anon-transitory" and insert --A non-transitory--.

Signed and Sealed this
Nineteenth Day of March, 2024

Katherine Kelly Vidal
*Director of the United States Patent and Trademark Office*